UNITED STATES PATENT OFFICE.

ANDREW STOCK AND EMIL MUELLER, OF PITTSBURG, PENNSYLVANIA.

PROCESS OF DECORATING GLASS.

SPECIFICATION forming part of Letters Patent No. 537,245, dated April 9, 1895.

Application filed November 27, 1893. Serial No. 492,109. (No specimens.)

*To all whom it may concern:*

Be it known that we, ANDREW STOCK and EMIL MUELLER, citizens of the United States, residing at Pittsburg, in the county of Allegheny and State of Pennsylvania, have invented certain new and useful Improvements in Processes of Decorating Glass; and we do hereby declare the following to be a full, clear, and exact description of the invention, such as will enable others skilled in the art to which it pertains to make and use the same, reference being had to the accompanying drawings, which form a part of this specification.

Our invention relates to an improved process of decorating glass ware by means of colors, and consists in painting the color on the glass and subjecting the same to a high temperature in a suitable furnace, then washing the same in warm water after cooling, and finishing the article with another color, and again heating the same as before, as will be fully described hereinafter.

To decorate glass ware in accordance with our invention or improved process we paint the parts or portions with a suitable paint, which may be composed of one part of oxide of copper and one part of yellow ocher mixed with water, or one part of sulphate of copper and one part of yellow ochre, and then place the article in a furnace or oven and bring the same to a high temperature, burning the color into the glass. The article is removed from the furnace and when sufficiently cold the same is washed in warm water. The other unpainted or crystal portions of the article are now given a coat of the paint, and the article again placed in the furnace for second burning, which reheating brings out the ruby of the first coat of paint, and changes the second to a yellow, amber, or green.

By means of this method of coloring parts of glass articles the same will enhance the value and beautify the dish or other article, and at the same time permit the manufacturer to sell the ware at a greatly reduced cost.

Having thus described our invention, what we claim, and desire to secure by Letters Patent, is—

The herein described process of decorating glass ware, consisting of painting the parts it is desired to color ruby and subjecting the article to a high temperature, then washing the article when cooled in warm water, then painting the parts yet in the crystal and again bringing the article to a high temperature, which will cause the first coat to become ruby, and the last a yellow, amber or green, substantially as described.

In testimony that we claim the foregoing we hereunto affix our signatures this 15th day of July, A. D. 1893.

ANDREW STOCK. [L. S.]
  EMIL MUELLER. [L. S.]

In presence of—
 ALBERT J. WALKER,
 M. E. HARRISON.